United States Patent [19]

Miguchi

[11] Patent Number: 4,827,392
[45] Date of Patent: May 2, 1989

[54] CONTROL APPARATUS FOR A POWER CONVERTER

[75] Inventor: Yasuhiko Miguchi, Tokyo, Japan
[73] Assignee: Kabushiki Kaisha Toshiba, Kawasaki, Japan
[21] Appl. No.: 223,628
[22] Filed: Jul. 25, 1988
[30] Foreign Application Priority Data Jul. 27, 1987 [JP] Japan .................. 62-187425

[51] Int. Cl.[4] .......................... H02H 7/122
[52] U.S. Cl. ........................ 363/56; 363/98; 363/132; 363/136; 363/41
[58] Field of Search ............ 363/41, 56, 78, 79, 363/96, 98, 131, 132, 136, 137

[56] References Cited

U.S. PATENT DOCUMENTS

| 4,371,824 | 2/1983 | Gritter ............................ 363/56 |
| 4,458,194 | 7/1984 | Geppert et al. .................. 363/41 |
| 4,719,400 | 1/1988 | Kurakake et al. ............... 363/56 |

OTHER PUBLICATIONS

Haneyoshi et al., "Waveform Compensation of PWM Inverter with Cyclic Fluctuating Loads", IEEE, 1986, pp. 744–751.

Primary Examiner—Peter S. Wong
Attorney, Agent, or Firm—Foley & Lardner, Schwartz, Jeffery, Schwaab, Mack, Blumenthal & Evans

[57] ABSTRACT

In a control apparatus for a power converter for controlling a power converter on the basis of stored values of a memory adapted to store variables over a fixed time period of the power converter while sequentially updating them, when an abnormal state occurs in the power converter, writing into the memory is stopped to effect a control using data having been stored immediately before that abnormal state occurs, thus to restart writing into the memory at the time when that abnormal state is removed.

6 Claims, 5 Drawing Sheets

CONTROL APPARATUS FOR A POWER CONVERTER

BACKGROUND OF THE INVENTION

1. Field of the Art

This invention relates to a control apparatus for a power converter, and more particularly to an apparatus for controlling a power converter, e.g., a PWM inverter for an uninterruptible power supply, a static var compensator, an active filter, etc. by making use of learning control.

2. Prior Art

For a control system for a power converter which can attain high speed response, "Deadbeat Control System" is proposed ("Deadbeat Microprocessor Control of PWM Inverter for Sinusoidal Output Waveform Synthesis" PESC '85 Conference Record, 1985).

However, even with high speed response as in such a deadbeat system, it is still difficult to control the output voltage such as a capacitor input load, a phase-controlled rectifier load, or the like so that the output distortion factor becomes sufficiently small. This is because if a correcting action is made only after a rise or dip due to each sudden load change of the cyclic load fluctuation, the correcting action never compensates the rise or dip already occurred.

Meanwhile, in "Waveform Compensation of PWM Inverter with Cyclic Fluctuating Loads" (IAS '86 Conference Record, 1986), it is reported that an application of a repetitive control to a PWM inverter having a rectifier load results in a very low distortion factor of the output voltage. In general, control method, including the repetitive control, which stores variables of a main circuit or a control circuit over a fixed time period and utilizes the stored values for a subsequent control, is called "Learning Control".

While the above-mentioned learning control is a very effective control method, it has the following problems. In an actual power converter, abnormal states such as load short-circuiting, overload, overvoltage, undervoltage, etc. may occur. If writing into the memory is simply continued during occurrence of an abnormal state as well, an abnormal value or values stored in the memory are to be erroneously utilized after the abnormal state ends and the normal operation restarts. As a result, waveforms after the restart will deviate.

SUMMARY OF THE INVENTION

Therefore, a first object of this invention is to provide a control apparatus for a power converter which is capable of providing a stable output immediately after an abnormal state ends even if a temporary abnormal state occurs in the power converter.

A second object of this invention is to provide a control apparatus for a power converter wherein even in the case that a time delay exists from the occurrence an abnormal state to the detection of the event, this control apparatus is capable of eliminating an influence of such a time delay to provide a stable output immediately after the abnormal condition is removed.

To achieve the above-mentioned objects, a control apparatus for a power converter according to this invention comprises a memory capable of storing variables of the power converter over a fixed time period, means for controlling the power converter on the basis of values of the variables stored in the memory, abnormal state detection means for detecting an abnormal state of the power converter, and writing control means that sequentially updates the contents of the memory by writing a newest variable into the memory when the abnormal state detection means does not detect an abnormal state, stops writing into the memory when the abnormal state detection means detects an abnormal state, and restarts writing into the memory when the power converter returns to a normal state or is expected to return to a normal state.

In addition, a control apparatus for a power converter comprises first and second memories capable of storing variables of the power converter over a fixed time period, means for controlling the power converter on the basis of values of the variables stored in the first memory, abnormal state detection means for detecting an abnormal state of the power converter, and writing control means that sequentially updates the contents of the memories by writing a newest variable into the first memory and writing the variable stored in the first memory at a corresponding location of the second memory when the abnormal state detection means does not detect an abnormal state, stops writing into the first memory and replaces variables written in the first memory immediately before stopping writing with variables stored in the corresponding location of the second memory when the abnormal state detection means detects an abnormal state, and restarts writing into the first and second memories when the power converter returns to a normal state or is expected to return to a normal state.

DETAILED DESCRIPTION OF PREFERRED EMBODIMENTS

Figure 1:
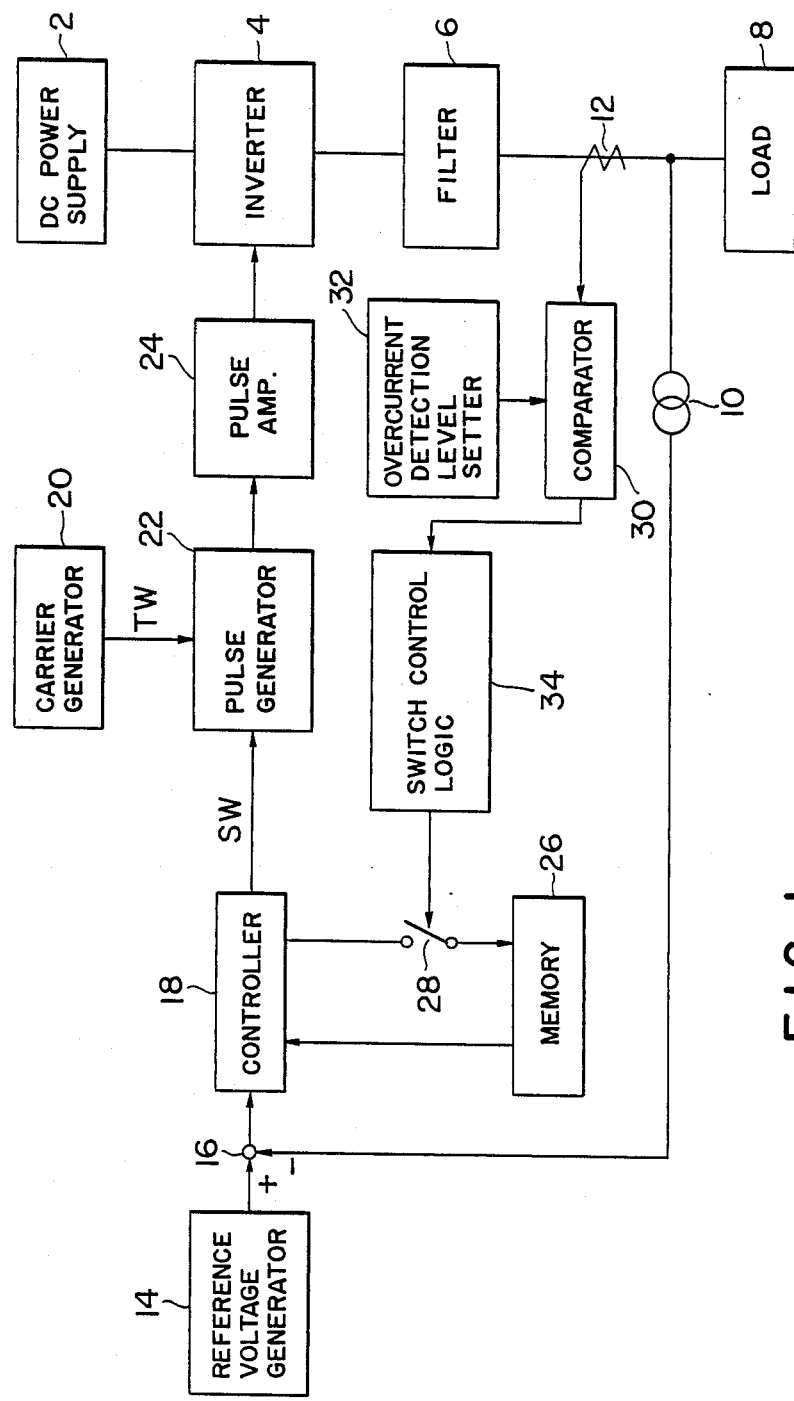
FIG. 1 shows a block diagram of a control apparatus for a power converter according to this invention.

FIG. 1 shows a triangular wave PWM controlled inverter and a control apparatus therefor. On the output side of a PWM controlled inverter 4 that converts d.c. power from a d.c. power supply 2 to a.c. power, a load 8 is connected through a filter 6 comprising a reactor and a capacitor. It is assumed that the inverter 4 is composed of transistors as an example.

A potential transformer 10 for detecting an output voltage of the inverter 4 obtained through the filter 6 is provided. A current transformer 12 for detecting an output current is provided.

In the case of this embodiment, the inverter 4 is controlled so that an output voltage detected by the potential transformer 10 becomes equal to a reference voltage given by a reference voltage generator 14. For this voltage control, a voltage deviation or error between a reference voltage from the reference voltage generator 14 and a voltage detected from the potential transformer 10 is obtained by a subtracter 16. A controller 18 outputs a modulation signal SW to make the voltage deviation to be zero. The controller 18 is constituted as a repetitive control type. A memory 26 for a learning control is provided in association with the controller 18. On the basis of a modulation signal SW from the controller 18 and a carrier signal TW from a carrier generator 20, a pulse generator 22 generates on control signals. These on control signals are amplified by a pulse amplifier 24. The signals thus amplified are delivered to the inverter 4 to drive transistors constituting the inverter 4.

Figure 2:
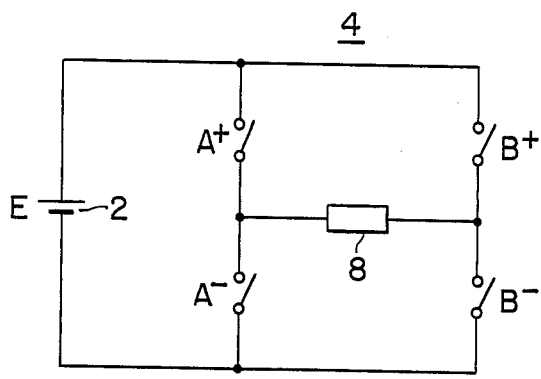
FIG. 2 shows an example of an actual circuit arrangement of the inverter in FIG. 1.
Figure 3:
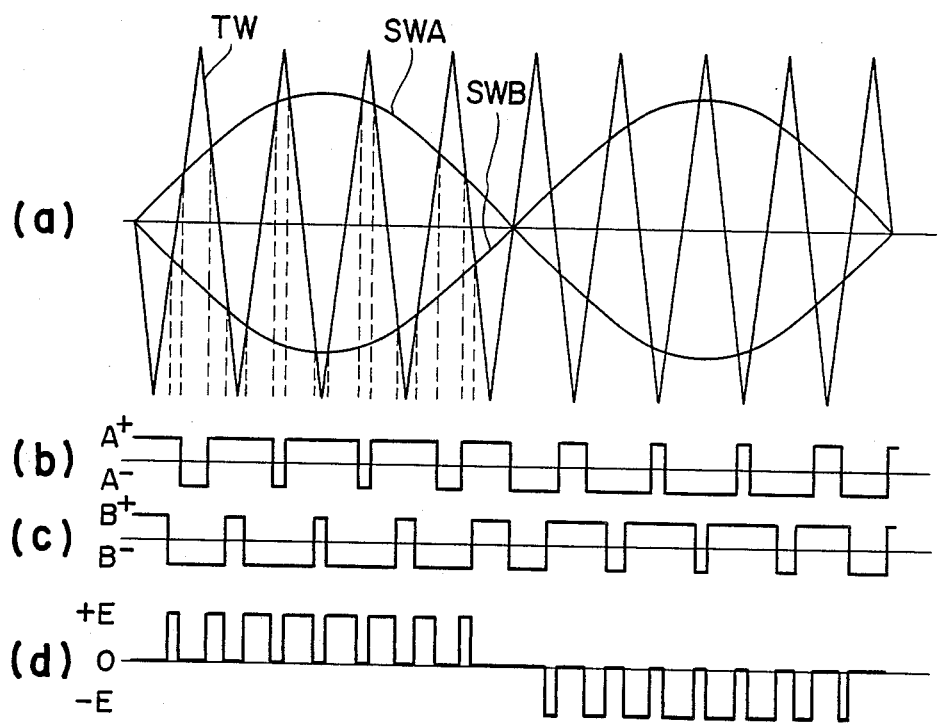
FIG. 3 shows a view for explaining the control principle of a PWM controlled inverter.

For explaining the principle of a PWM control of the inverter 4, it is assumed that, as shown in FIG. 2, the inverter 4 is comprised of four transistor switches A+, A−, B+ and B− and the voltage of the d.c. power supply is E volts. When a modulation signal SW is output from the controller 18, the pulse generator 22 forms a pair of modulation signals SWA and SWB opposite to each other in phase on the basis of the modulation signal SW (FIG. 3(a)). Then, the pulse generator 22 output on control signals for driving transistor switches A+, A−, B+ and B− on the basis of the modulation signals SWA and SWB and a triangular wave carrier TW (FIG. 3(a)) delivered from the carrier generator 20 (FIGS. 3(b) and (c)). When the AND condition of both the on control signals of switches A+ and B− and the AND condition of both the on control signals of switches A− and B+ are satisfied, the inverter 4 produces an output voltage. Thus, a PWM controlled output voltage as shown in FIG. 3(d) is provided.

Figure 4:
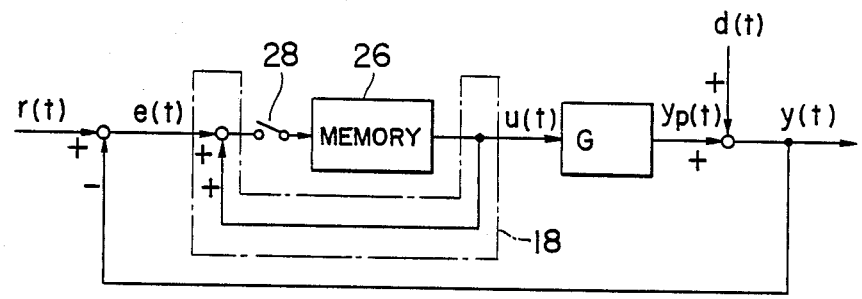
FIG. 4 shows a block diagram in which the apparatus in FIG. 1 is expressed as a control system.

With reference to FIG. 1 again, the controller 18 is constituted as a repetitive control type controller and the control system thereof including memory 26 can be expressed as shown in FIG. 4. In this control system, u(t) is an input to a controlled system (=pulse generator 22, pulse amplifier 24, inverter 4, filter 6, and load 8), $y_P(t)$ is an output when disturbance of the controlled system G is not taken into consideration, r(t) is a cyclic reference signal (corresponding to reference voltage), e(t) is a control deviation, d(t) is a cyclic disturbance (corresponding to change in load), and y(t) is an output of the controlled system when cyclic disturbance d(t) is taken into account. A part encompassed by dotted lines corresponds to the controller 18 shown with its gain being omitted.

The memory 26 has a memory area corresponding to one period based on the output frequency of the inverter 4. In a normal state (in a non-abnormal state), a switch 28 inserted into the input circuit is closed, thus the contents of the memory 26 is sequentially updated by storing the output variable of the controller. Thus, control input u(t) of a present cycle can be determined on the basis of data one cycle immediately before the present cycle. By such a learning control, even under sudden change of load cyclically occurring every cycle, influence thereon is canceled, so that a control input u(t) such that output y(t) is equal to a desired value is produced.

When the switch 28 is opened, new writing into the memory 26 is not conducted. Stored values written immediately before opening the switch 28 are maintained. The stored values are still read by the controller 18 and are then output therefrom.

The switch 28 is opened when an abnormal state, e.g., overload or overvoltage, or the like is detected. In the embodiment in FIG. 1, means for overcurrent detection is shown as one example of abnormal state detection. An output current of the inverter 4 detected by the current transformer 12 is compared with an overcurrent detection level set by an overcurrent detection level setter 32. When it exceeds the over current detection level, an overcurrent detection signal is output to a switch control logic 34. The switch control logic 34 opens the switch 28 on the basis of the overcurrent detection signal.

Figure 5:
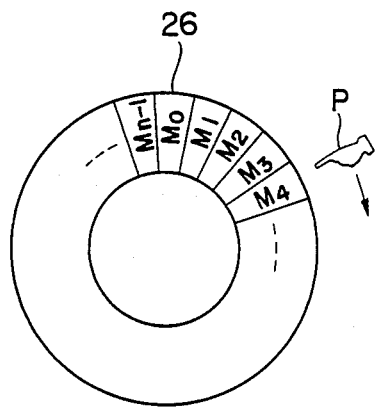
FIG. 5 shows a detailed configuration of the memory in FIG. 1.

An example of the memory 26 is shown in FIG. 5. This memory is constituted as a ring buffer. When the frequency of PWM inverter is designated by f (e.g., 50 Hz) and the sampling frequency is designated by f·n, this ring buffer includes an n number of memory elements $M_0, M_1, \ldots, M_{n-1}$. A pointer P is moving around the ring buffer at a speed synchronous with the phase rotation of the inverter output voltage. Thus, the content of a memory element indicated by the pointer P is read. Only when the switch 28 is closed, a variable of the controller 18 is written into a memory element indicated by the pointer P.

The operation of this embodiment thus constituted will be now described.

The controller 18 computes a modulation signal SW corresponding to the error voltage. The pulse generator generates a pulse signal for allowing the transistors constituting the inverter 4 to be in on state on the basis of the modulation signal SW and the carrier signal TW from the carrier generator 20. This pulse signal is amplified by the pulse amplifier 24 and is then applied to the PWM inverter 4. The a.c. power produced thereby is delivered to the load 8. An output voltage of the inverter 4 is detected by the potential transformer 10. The output voltage thus detected is fed back to the subtracter 16. Accordingly, an error between the reference voltage from the reference voltage generator 14 and the voltage detected by the potential transformer 10 is input to the controller 18. Responding to this, the controller 18 outputs a modulation signal SW such that the error is equal to zero by making a reference to data of the memory 26 as well. In this way, the output voltage of the inverter 4 can be in correspondence with the reference voltage ("1st cycle" in FIG. 6).

Figure 6:
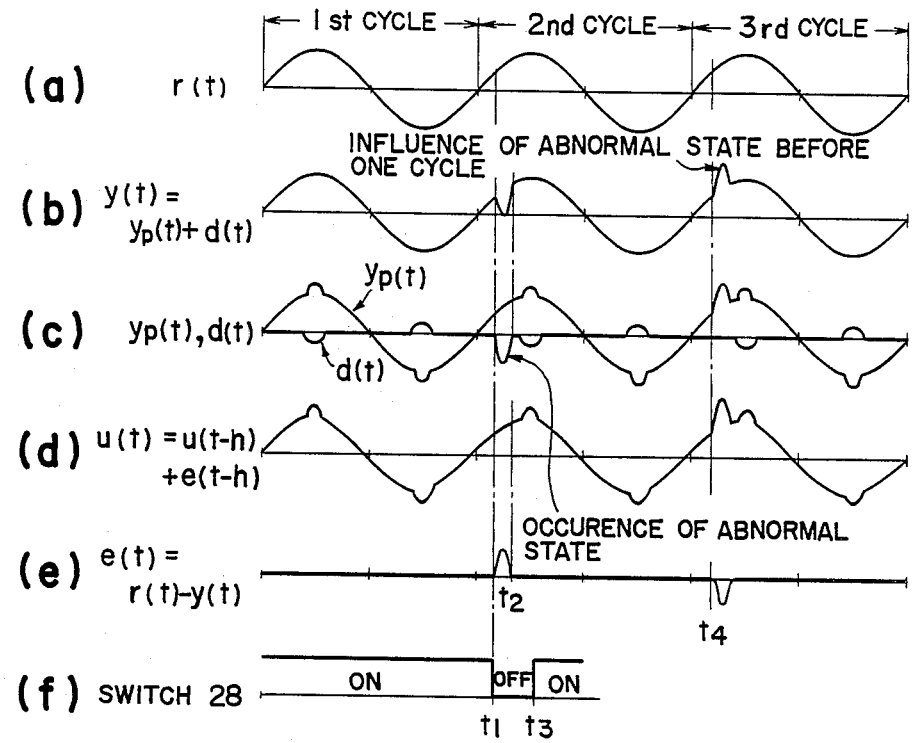
FIG. 6 shows a time chart for explaining the operation of the apparatus in FIGS. 1 and 4.

It is now assumed that, as shown in FIG. 6, an overload occurs at time $t_1$ within the 2nd cycle and disturbance d(t) has an influence thereof, and such an overload is removed at time $t_2$. Due to this overload, output y(t) begins being disturbed at time $t_1$. Under such a condition, if writing into the memory 26 is continued irrespective of presence of an abnormal state in accordance with the prior art (the switch 28 is assumed to continue to be in on state in this case), output y(t) is affected thereby at time $t_4$ corresponding to the same phase point of the 3rd cycle where an abnormal state has been already removed, resulting in distorted waveform. It is to be noted that time "h" refers to one cycle of the inverter output.

When the output y(t) is disturbed by overload at time $t_1$, it will be transiently disturbed at time $t_2$ and times subsequent thereto where an overload will be removed. However, it is possible to virtually predict a time until a disturbed output is returned to a normal output y(t) after an abnormal state has been removed (recovery time) in accordance with how the control system is designed. Thus, in accordance with this invention, an abnormal state or an overload is detected by comparator 30 at time $t_1$, then the switch 28 is turned off through switch control logic 34 to stop Writing into memory 26, and at time $t_3$ determined by taking recovery time into account, the switch 28 is turned on through switch control logic 34, to restart writing into the memory 26. For a time period during which writing into the memory 26 is stopped, data written in a previous cycle is read as previously described. As a result, the variables of the controller 18 one cycle before (1st cycle) where the circuit has been in a normal state are preserved in memory elements corresponding to electric angle from time $t_1$ to $t_3$ of the memory 26. Accordingly, differently from the state shown at the 3rd cycle of FIG. 6, a normal control without any hindrance similar to that in the first cycle can be conducted in the 3rd cycle and cycles subsequent thereto. Thus, in accordance with this embodiment, even in the case that an abnormal state transiently occurs at certain cycle, it is possible to conduct a normal control from the subsequent cycle.

Meanwhile, it has been described in the above-mentioned first embodiment that the occurrence of overload, the dip of load voltage, detection of overload, and opening of the switch 28 are produced or carried out at the same time $t_1$. However, since a certain time difference exists therebetween actually, if writing is stopped at time $t_1$, data in an abnormal state have been already written into some memory elements before that time.

Figure 7:
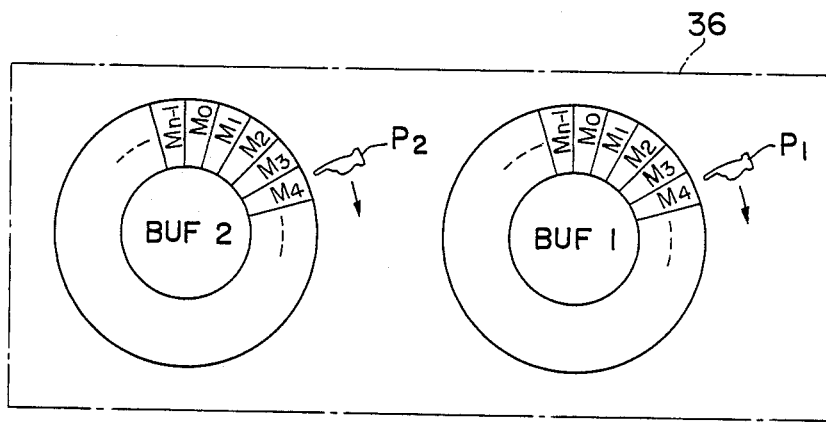
FIG. 7 shows an example of a different configuration of the memory.

FIG. 7 shows a memory 36 of a second embodiment in which the fact mentioned above is taken into account. This memory 36 is comprised of two ring buffers BUF1 and BUF2. Both the ring buffers BUF1 and BUF2 are provided with pointers P1 and P2 rotating at a speed synchronous with the phase rotation of the inverter output voltage, respectively. This memory 36 is used instead of memory 26 (FIG. 5). When the circuit is in a normal state, the switch 28 is closed. Thus, writing a variable of the controller 18 into the ring buffer BUF1 is conducted. In addition, the content of a memory element indicated by the pointer P1 of the ring buffer BUF1 is delivered to the controller 18, and at the same time its content is written into a memory element indicated by the pointer P2 of the ring buffer BUF2. Accordingly, in a normal condition, data one cycle before the presently indicated data of the ring buffer BUF1 is written into the ring buffer BUF2.

Figure 8:
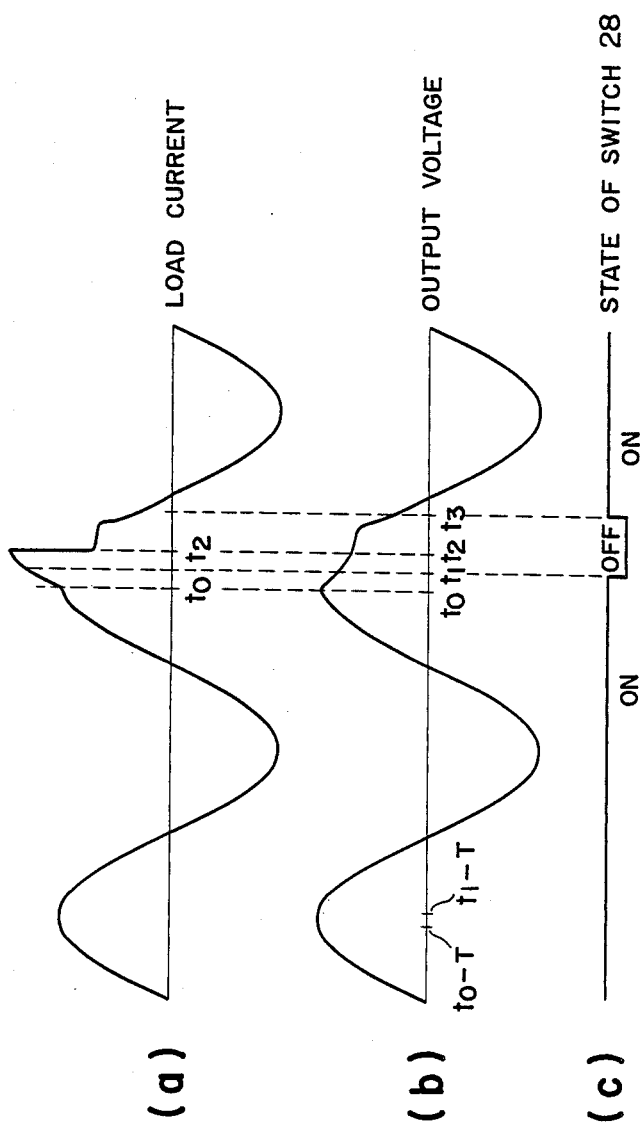
FIG. 8 shows a time chart for explaining an example of the operation when memory in FIG. 7 is used.

It is now assumed that when an overload occurs at time $t_0$ and the overload is removed at time $t_2$, as shown in FIG. 8(a), the output voltage changes as shown in FIG. 8(b). On the other hand, when the comparator 30 is assumed to detect an overcurrent at time $t_1$ later than time $t_0$, the switch control logic 34 opens (turns off) the switch 28 for a time period from time $t_1$ to $t_3$ as shown in FIG. 8(c) to stop writing into the ring buffer BUF1. In addition, in order to modify data written into the ring buffer BUF1 immediately before writing is stopped, the switch control logic 34 writes data written into the ring buffer BUF2 one cycle before, i.e., data from time $t_0-T$ which is one cycle earlier than the time at which overload has occurred to time $t_1-T$ which is one cycle earlier than the time $t_1$ at which Writing into the ring buffer BUF1 is stopped, into Corresponding memory elements of the ring buffer BUF1. As a result, data in a normal state will be revived into the ring buffer BUF1.

As just described above, in accordance with this embodiment, even if a time delay exists until writing into the memory is stopped after an overload has occurred, such a delay can be corrected by data in another memory. Thus, this embodiment can carry out more stable control as compared to that in the first-mentioned embodiment.

It is to be noted that while it has been described in the above-mentioned respective embodiments that an overload has occurred as an abnormal state, a comparator responsive to voltage may be used as comparator 30 to cope with overvoltage or undervoltage.

It is further to be noted that this invention may be applicable to other power converters, e.g., static var compensator, active filter, and the like, in addition to uninterruptible power supply with PWM inverter control.

What is claimed is:

1. A control apparatus for a power converter comprising:
   a memory capable of storing variables of said power converter over a fixed time period;
   means for controlling said power converter on the basis of values of said variables stored in said memory;
   abnormal state detection means for detecting an abnormal state of said power converter; and
   writing control means that sequentially updates the contents of said memory by writing a newest variable into said memory when said abnormal state detection means does not detect an abnormal state, stops writing into said memory when said abnormal state detection means detects an abnormal state, and restarts writing into said memory when said power converter returns to a normal state or is expected to return to a normal state.

2. A control apparatus as set forth in claim 1, wherein said memory includes a ring buffer.

3. A control apparatus as set forth in claim 1, wherein said writing control means includes a switch for controlling timings of stopping and restarting of writing into said memory.

4. A control apparatus for a power converter comprising:
   first and second memories capable of storing variables of said power converter over a fixed time period;
   means for controlling said power converter on the basis of values of said variables stored in said first memory;
   abnormal state detection means for detecting an abnormal state of said power converter; and
   writing control means that sequentially updates the contents of said memories by writing a newest variable into said first memory and writing the variable stored in said first memory at a corresponding location of said second memory when said abnormal state detection means does not detect an abnormal state, stops writing into said first memory and replaces variables written in said first memory immediately before stopping writing with variables stored in the corresponding location of said second memory when said abnormal state detection means detects an abnormal state, and restarts writing into said first and second memories when said power converter returns to a normal state or is expected to return to a normal state.

5. A control apparatus as set forth in claim 4, wherein said first and second memories include a ring buffer, respectively.

6. A control apparatus as set forth in claim 4, wherein said writing control means includes a switch for controlling times of stopping and restarting of writing into said first memory, and rewriting of variables therein.

* * * * *